US005652299A

United States Patent [19]
Nakajima et al.

[11] Patent Number: 5,652,299
[45] Date of Patent: Jul. 29, 1997

[54] WATER-BASED VACUUM FORMING LAMINATING ADHESIVE

[75] Inventors: Masayuki Nakajima, Franklin Park Borough; Richard L. Coalson; Kurt G. Olson, both of West Deer Township, Allegheny County; Umesh C. Desai, McCandless Township, Allegheny County, all of Pa.

[73] Assignee: PPG Industries, Inc., Pittsburgh, Pa.

[21] Appl. No.: 718,285

[22] Filed: Sep. 20, 1996

[51] Int. Cl.$^6$ .................. C08J 3/00; C08K 3/20; C08L 75/00
[52] U.S. Cl. .......... 524/589; 524/590; 524/591; 524/839; 524/840; 524/507; 525/123; 525/452; 525/453; 525/455
[58] Field of Search .................. 524/589, 590, 524/591, 839, 840, 507; 525/123, 455, 452, 453

[56] References Cited

U.S. PATENT DOCUMENTS

| | | | |
|---|---|---|---|
| 4,670,100 | 6/1987 | Henning et al. | 524/839 |
| 4,762,880 | 8/1988 | Leung | 524/853 |
| 4,853,061 | 8/1989 | Leung | 156/216 |
| 5,430,094 | 7/1995 | Gola et al. | 524/507 |

*Primary Examiner*—Patrick Niland
*Attorney, Agent, or Firm*—Dennis G. Millman

[57] ABSTRACT

A water-based vacuum forming laminating adhesive includes an ionic water-dispersed polyurethane, a carbodiimide and/or an aziridine, and optionally a vinyl acetate polymer. The polyurethane is characterized by a high polydispersity index, which provides a combination of adhesion and thermal stability. The polyurethane is made by chain extending an isocyanate functional urethane prepolymer with polyamine and ketimine.

17 Claims, No Drawings

WATER-BASED VACUUM FORMING LAMINATING ADHESIVE

BACKGROUND OF THE INVENTION

The present invention relates to water-based adhesives particularly useful for lamination of plastic films by vacuum forming techniques. This technique is used to make parts for the automotive and furniture industries.

Vacuum forming is a well known process, particularly in the automotive industry. For example, a thermoplastic material (e.g., polyvinyl chloride flexible sheeting) can be laminated onto automobile components such as consoles, instrument panels, door panels and other interior surfaces using vacuum forming. The substrates can be any commonly known materials, such as acrylonitrile-butadiene-styrene terpolymer (ABS) or fiberboard. The process includes coating the substrate with a laminating adhesive, heating the thermoplastic material past its softening point, and draping the thermoplastic material onto the substrate. A vacuum is then applied through the substrate to pull the thermoplastic material onto the contours of the substrate.

Use of organic solvent-based adhesives in vacuum forming is common in the industry. Emission of organic solvents to the atmosphere is a concern, and reduction of the volatile organic content of adhesive compositions is very desirable to comply with government regulations. Such adhesives present work hazards typically associated with organic solvents. A water-based thermoforming adhesive is disclosed in U.S. Pat. Nos. 4,762,880 and 4,853,061. These patents disclose the use of an adhesive having an aqueous aromatic polyurethane emulsion or dispersion and a water dispersible crosslinking agent, such as an unblocked organic isocyanate compound. The compositions disclosed in these patents are stable for only several hours, and within about seven hours recognizable performance decreases are observed. Stability of adhesive compositions is an important factor in determining their usefulness. For example, compositions having stability comparable to those disclosed in the above-identified patents must be stored in such a manner that the reactive components are separate and mixed only immediately prior to application. Such handling requirements impose additional costs. Moreover, such compositions are particularly uneconomical if, for example, a stoppage is encountered on a production line. In such an instance, an entire batch of adhesive can react sufficiently during the delay to require disposal of the batch.

In view of the foregoing discussion, there is a need for a single package water-based vacuum forming laminating adhesive composition which is highly stable and provides excellent adhesive properties.

U.S. Pat. No. 5,430,094 (Gola et al.) discloses an aqueous adhesive composition that includes a vinyl acetate polymer, an ionic water-dispersed polyurethane, and an aziridine. That patent discloses a composition that is required to have less than about 0.2 milliequivalents of potentiometrically titratable acid, more particularly less than about 0.1 milliequivalents of potentiometrically titratable acid, and most particularly less than about 0.05 milliequivalents of potentiometrically titratable acid. It would be desirable to be free from such a restriction as to acid content.

SUMMARY OF THE INVENTION

The present invention is a stable, water-based adhesive composition that includes a cationic water-dispersed polyurethane, carbodiimide and/or an aziridine. Typically, the compositions also include a substantial amount of a vinyl acetate polymer as a blending resin to reduce the cost of the adhesive.

Particularly characterizing the invention is the novel polyurethane used in the composition. The polyurethane is water-dispersible and has an exceptionally high polydispersity index of at least 20, most preferably at least 25. The polyurethane is made by reacting, in solvent, at least one polyisocyanate and at least one polyol to make an isocyanate functional urethane prepolymer. The resulting urethane prepolymer is then chain extended by reacting some of the remaining isocyanate groups with a polyamine to yield the polyurethane. It has been found to be advantageous for achieving the desired polydispersity to use as the chain extender a polyamine compound having at least two primary amine groups, preferably at least three primary amine groups, thereby yielding a substantial amount of high molecular weight polymer. Simultaneously, in order to assure a substantial amount of relatively low molecular weight polymer, the chain extending polyamine is used in combination with a compound capable of capping the chain growth by reacting with a portion of the isocyanate groups on the prepolymer. It has been found to be highly advantageous to use ketimines as the chain capping compound, preferably diketimines. Secondary amines in the ketimines react with the isocyanate groups, thereby terminating chain growth. Upon subsequent introduction of water, the imine groups are hydrolyzed, producing primary amine groups that are available for cationic salt formation, thereby rendering the polymer dispersible in water. Following dispersion in water, the organic solvent used during polymer synthesis may be stripped.

Excellent adhesion and stability are attained without the need to maintain a particularly low level of titratable acid.

DETAILED DESCRIPTION OF THE INVENTION

The vinyl acetate polymer of the present invention can be polyvinyl acetate, or a polymer derived from polyvinyl acetate such as a polyvinyl alcohol produced by alcoholysis of a polyvinyl acetate, or a polyvinyl acetal produced by condensation of a polyvinyl alcohol with an aldehyde, acetaldehyde, formaldehyde or butyraldehyde. The polyvinyl acetals include polyvinyl acetal, polyvinyl formal, and polyvinyl butyral. The vinyl acetate polymer of the present invention also includes copolymers produced from vinyl acetate monomers and other monomers. For example, such comonomers include alpha olefins such as ethylene, acrylates such as methyl acrylate, maleates such as diethyl maleate, fumarates such as dimethyl fumarate and vinyl monomers such as vinyl chloride. Polymerization of vinyl acetate and of vinyl acetate and copolymerizable monomers can be conducted by methods known in the art. For example, bulk and solution polymerization, emulsion polymerization and suspension polymerization can be used.

The preferred vinyl acetate polymer of the present invention is a vinyl acetate homopolymer. The vinyl acetate polymer of the present invention is typically present in the composition in an amount between about 8 weight percent and about 48 weight percent, more preferably between about 18 weight percent and about 38 weight percent, and most preferably between about 24 weight percent and about 32 weight percent based on total weight of resin solids.

A suitable vinyl acetate homopolymer commercially available is known as RHOPLEX VA 2113, from Rohm and Haas. RHOPLEX VA 2113 is a vinyl acetate homopolymer emulsion with a solids content of 55%, a pH at 25° C. of 4.5, a viscosity at 25° C. of 1100 cps., an average particle size of 0.20 microns, a specific gravity of emulsion at 25° C. of 1.11, and a $T_g$ of 29° C. Another suitable vinyl acetate product is AIRFLEX 300, AIRFLEX 400 or AIRFLEX 440, which are ethylene/vinyl acetate copolymers commercially available from Air Products and Chemicals, Inc. Yet another suitable product is ROVACE 3357, a vinyl acetate polymer sold by Rohm & Haas.

The water-dispersed polyurethane of the present invention is preferably is cationic. The polyurethane can be prepared by methods known in the art, and is typically prepared by reaction of a polyisocyanate with a compound having a plurality of hydroxyl groups to form an isocyanate-functional urethane prepolymer.

The polyisocyanates for preparing the urethane prepolymer can be aliphatic or aromatic isocyanates. Representative examples are the aliphatic isocyanates such as trimethylene, tetramethylene, pentamethylene, hexamethylene, 1,2-propylene, 1,2-butylene, 2,3-butylene, and 1,3-butylene diisocyanates; the cycloalkylene compounds such as 1,3-cyclopentane, 1,4-cyclohexane, 1,2-cyclohexane diisocyanates and isophorone diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-tolylene, or mixtures thereof, 4,4'-toluidine, and 1,4-xylylene diisocyanates; the nuclear-substituted aromatic compounds such as dianisidine diisocyanate, 4,4'-diphenylether diisocyanate and chlorodiphenylene diisocyanate; the triisocyanates such as triphenyl methane-4,4',4"-triisocyanate, 1,3,5-triisocyanate benzene and 2,4,6-triisocyanate toluene; and the tetraisocyanates such as 4,4'-dimethyldiphenyl methane-2,2',5,5'-tetraisocyanate; the polymerized polyisocyanates such as tolylene diisocyanate dimers and trimers, and the like.

Polyhydroxy compounds useful for reacting with the polyisocyanates to prepare the urethane prepolymers are typically hydroxy terminated polyethers or polyesters. The polyethers are typically poly(oxyalkylene) derivatives of polyhydric alcohols, such as glycerol, trimethylolpropane, 1,2,6-hexanetriol, sorbitol, mannitol, pentaerythritol or sucrose. Suitable polyesters are typically prepared from reaction of a carboxylic acid and a polyol, for example, reaction between adipic acid or phthalic acid and ethylene glycol, propylene glycol, 1,3-butylene glycol, 1,4-butylene glycol, diethylene glycol, 1,2,6-hexanetriol, trimethylolpropane, or trimethylolethane.

The urethane prepolymer prepared by reacting a polyisocyanate with a polyhydroxy compound is provided with cationic groups to make the polymer water dispersible. Polymers containing suitable salt precursors can be converted to the cationic salts by adding a quaternizing or neutralizing agent to the polymer. In the present invention, compounds containing amine groups serve both to introduce salt forming groups and to chain extend the urethane prepolymer to form a polyurethane resin containing a wide range of molecular weights.

For the purpose of chain extending the urethane prepolymers, polyamines having at least two primary amine groups, preferably at least three amine groups, are reacted with the isocyanate groups of the urethane prepolymer. Alkylene polyamines may be used, but particularly preferred are the triamines sold under the name JEFFAMINE® by Texaco, characterized by the structure:

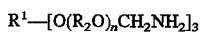

where $R^1$ and $R^2$ are alkyl groups having 1 to 3 carbon atoms.

Polyamine ketimines that may be used together with the polyamines during the chain extension step are derived from the reaction of a polyamine with a ketone. Preferred polyamines for making the ketimines are alkylene polyamines and the substituted alkylene polyamines. Especially preferred polyamines are selected from those having the following formula:

$$H_2NRNHRNH_2$$

where R is a difunctional aliphatic group containing from 2 to about 48 carbon atoms. R may represent the same or different radicals in any one polyamine compound. Inert or non-interfering groups may be present on the group R. Particularly preferred are polyamines in which R is an aliphatic hydrocarbon group. It is still more preferred that R is an alkylene group of 2 to 6 carbon atoms. Typical examples of preferred polyamines for making the ketimines include diethylene triamine and the higher homologs of polyethylene polyamine, as well as the corresponding propylene and butylene polyamines. Other amines which may be employed include primary-secondary amines such as N-aminoethyl piperazines or amines corresponding to the formula:

$$RNH—R—NH_2$$

These polyamines are converted to ketimines by reaction with ketones of the following formula:

where $R_1$ and $R_2$ are organic radicals and are each substantially inert to the kerimine formation reaction. Preferably $R_1$ and $R_2$ are short chain alkyl groups (1 to 4 carbon atoms). It is often preferred to use a ketone which boils below or near the boiling point of water or which readily distills with water. Preferred examples include acetone, methyl ethyl ketone, diethyl ketone, methyl propyl ketone, methyl isopropyl ketone, methyl n-butyl ketone, methyl isobutyl ketone, ethyl isopropyl ketone, cyclohexanone, cyclopentanone, acetophenone, and the like. Especially preferred are acetone, methyl ethyl ketone and methyl isobutyl ketone.

The ketones react with the primary amine groups of the polyamines (m-$NH_2$) as follows:

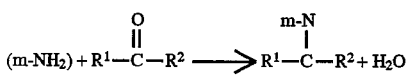

When the polyamine includes two primary amine groups, each polyamine may react with two ketones to form a diketimine.

When the ketimines are included in the chain extending step, the secondary amine groups in the ketimines are reacted with a portion of the isocyanate groups contained in the urethane pre-polymers, thereby partially capping chain growth. Simultaneously, chain growth progresses by reaction of other isocyanate groups with the polyamine chain extending agent. As a result, the resulting chain-extended polyurethane has a combination of a substantial portion of relatively high molecular weight polymers and a substantial portion of relatively low molecular weight polymers. Thus, the polyurethane of the present invention exhibits the high polydispersity index (at least 20, most preferably at least 25) that has been found advantageous for use in adhesive compositions. On the basis of equivalents of isocyanate-reactive groups, the ratio of polyamine to kerimine used in the chain extending step may range from 1:1 to 4:1, preferably 1.1:1 to 3:1. In specific preferred embodiments, a ratio of 2:1 has been found to be satisfactory. Substantially all of the isocyanate groups are reacted during the chain extension step.

Polydispersity index is the number derived from dividing the weight average molecular weight by the number average molecular weight. Relatively low molecular weights may be considered those in the 3,000 to 10,000 range. Some molecules with molecular weights below 3,000 may be present in the polyurethane of the present invention, but their mounts are not significant, nor is their presence believed to be useful. Relatively high molecular weights may be considered to be those greater than 30,000 and particularly those greater than 100,000. The polyurethanes of the present invention have a substantial content of polymers having molecular weights greater than 30,000 and greater than 100,000. Expressed differently, the polyurethanes of the present invention are comprised of at least 10 percent (preferably at least 15 percent) of polymers having molecular weights (weight basis) greater than 100,000 and at least 10 percent (preferably at least 15 percent) polymers having molecular weights (weight basis) less than 10,000. The high molecular weight portion provides temperature resistance to the polymer, and the low molecular weight portion provides bonding strength to the polymer.

It is significant that the synthesis of the polyurethane through the chain extension step is carried out in organic solvent medium, in which the imine groups of the ketimines are stable. Following the chain extension step, water is introduced into the system, whereby the imine groups hydrolyze and are converted to cationic salt groups that aid in dispersing the polyurethane in water. Thus, the ketimines in effect provide blocked mine groups during chain extension, thereby partially capping molecular weight growth as well as providing amine groups for the subsequent aqueous dispersion step.

A particular utility for the aqueous polyurethanes of the present invention is in adhesive compositions, particularly those used in vacuum forming of laminates. The following portion of the description relates to formulating this type of adhesive using the polyurethane of the present invention.

The polyurethane resin of the present composition is typically present in vacuum forming adhesive compositions in amounts of between about 24 weight percent and about 64 weight percent, more preferably between about 34 weight percent and about 54 weight percent, and most preferably between about 40 weight percent and about 48 weight percent based on total weight of resin solids.

A second component found useful in the adhesive compositions of the present invention is carbodiimide, which is a wetting agent and provides better coverage of the composition on a substrate. It is also believed to contribute to adhesion and thermal stability of the compositions. As used herein, the term carbodiimide refers to carbodiimide and substituted carbodiimides. Typically, a carbodiimide is present in the composition in amounts between 0.5 weight percent and 10 weight percent, more preferably between 1 weight percent and 8 weight percent, and most preferably between about 2 weight percent and about 5 weight percent based on total weight of resin solids. A commercially available multifunctional carbodiimide that has been found useful is available from Union Carbide under the name UCARLINK XL 29SE. Other analogous materials include hydrogen cyanamide, dicyandiamide.

Some embodiments of vacuum forming adhesive compositions further include an aziridine compound, although it is not required for the desired performance properties. The aziridine compound primarily serves as a blending resin, that is, to reduce the overall cost of the adhesive compositions. In some formulations, it is believed to also improve heat resistance under some circumstances. As used herein, the term azifidine refers to any alkyleneimine and includes any compound based on the following structure:

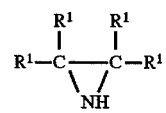

where $R^1$ is hydrogen, an alkyl radical having 1 to 3 carbon atoms, phenyl or combinations thereof.

Preferably, the aziridine is based on the following structure:

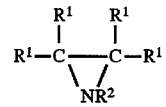

wherein $R^1$ is as described above and $R^2$ is hydrogen or an alkylene radical having 1 to 4 carbon atoms. Such aziridines include ethyleneimine, ethyl ethyleneimine and propyleneimine. The aziridine compound of the present invention also includes polyfunctional aziridines. Particularly useful polyfunctional aziridines include trimethylolpropane-tris-($\beta$-(N-aziridinyl) propionate) and pentaerythritol-tris-($\beta$-(N-aziridinyl)propionate). The aziridine compound of the adhesive composition is typically present in amounts between 0 weight percent and 10 weight percent. When aziridine is used, it is preferably included in amounts between 1 weight percent and 6 weight percent, and most typically between 2 weight percent and 5 weight percent based on total weight of resin solids in the adhesive.

The two polyfunctional aziridine curing agents specified above are available commercially from Virginia Chemicals of Portsmouth, Va. as XAMA-2 and XAMA-7, respectively. XAMA-2 has a solids content of 100%, an aziridine content of 6.00 to 7.00 milliequivalents per gram, an aziridine functionality of about 2.7, a density at 25° C. of 1.109 grams/ml., a viscosity at 25° C. of 125–500 cps., a freezing point of less than −15° C., a vapor pressure of less than 0.1 mm, and a solubility in water of 6.5 weight %. XAMA-7 has a solids content of 100%, an aziridine content of 6.35–6.95 milliequivalents/gram, an aziridine functionality of about 3.3, a density at 25° C. of 1.185 grams/ml., a viscosity at 25° C. of 1200–2000, a freezing point of less than −10° C., and is completely miscible in water.

The present composition also optionally includes other additives. One such additive is a butyl benzene sulfonamide plasticizer. This compound and other similar compounds are useful as wetting agents and to improve flow of the composition. Typically, the butyl benzene sulfonamide plasticizer is present in the composition in amounts between 0 weight percent and about 33 weight percent, more preferably between 5 weight percent and 20 weight percent, based on total weight of resin solids. A commercially available butyl benzene sulfonamide plasticizer is available from The C.P. Hall Company as PLASTHALL BSA, which has a solids content of 100%. Another class of compounds useful in this regard are melamine derivatives such as the alkoxylated melamine resins sold under the CYMEL® name by Cytek Technologies Corp. As an example, CYMEL® 303 hexamethyoxymethyl reelamine has been used.

The present composition can also optionally include propylene glycol and other similar compositions for use as plasticizer. Typically, propylene glycol, when used, is present in the composition in amounts between about 0.5 weight percent and about 6 weight percent, more preferably between about 1 weight percent and about 5 weight percent, and most preferably between about 2 weight percent and about 4 weight percent based on total weight of resin solids.

Typically, the adhesive compositions include water in an amount of between about 25 weight percent and about 75 weight percent, more preferably between about 40 weight percent and about 60 weight percent, most preferably between about 45 weight percent and about 53 weight percent based on total weight of the composition.

The adhesive compositions of the present invention are characterized by stability prior to use. In particular, they are sufficiently stable to be useful as a single-component or "one package" adhesive in which all of the components are combined substantially prior to application without gelation of the composition and without unacceptable increases in viscosity before use. Once a composition gels, it is no longer possible to use it as an adhesive. If the viscosity of a composition increases to the point of being difficult to spray, but the composition is not gelled, additional solvent can be added to reduce viscosity to acceptable levels. Stability can be measured as an increase in viscosity over time at a given temperature. Various standard tests for measuring viscosity can be used. For example, a Brookfield viscometer measures the resistance encountered by a spindle being rotated through a container of material being evaluated.

The stability of a composition for use as a single-component composition can be evaluated by comparison of the viscosity of a fresh composition against the same composition after a given time at a given temperature. The composition of the present invention is formulated such that with an initial viscosity of about 1000–3000 centipoise (cps), after about 30 days, more preferably after about 60 days, and most preferably after about 90 days, at ambient temperature the composition has less than about a 50% gain in viscosity, more preferably less than about a 35% gain and most preferably less than about a 25% gain, the viscosity being measured with a Brookfield viscometer with a number 5 spindle. Ambient temperature is considered to be less than about 28° C. and more typically at about 25° C. It should be noted that stability of the present composition is determined at ambient temperatures and that, at elevated temperatures, it may not achieve high stability characteristics.

Although a preferred embodiment of the present process is specifically adapted for adhering thermoplastic material to structural parts in automobiles, the compositions are useful in applying material to virtually any structural or decorative substrate. Typically, the substrate can be acrylonitrile-butadiene-styrene terpolymers (ABS), high impact polystyrene (HIPS), styrene-acrylonitrile copolymers (SAN), polyvinyl chloride (PVC or "vinyl"), polycarbonate (PC), high density polyethylene (HDPE), polyphenylene oxide (PPO) and fiberboard.

The thermoplastic material can be any such material known to those skilled in the art. Such material includes, without limitation, polyvinyl chloride, polyolefin, cloth, and polyurethane.

Application of the adhesive can be achieved in any manner known to those skilled in the art, and includes, for example, spraying the adhesive onto the substrate. The adhesive is typically applied at film thicknesses of between about 1 mils and about 15 mils, and more typically between about 3 mils and about 7 mils. The composition is then dried on the substrate. Drying can be achieved by allowing the coated substrate to air dry at room temperature or by actively drying the composition with elevated temperatures. Depending on the temperature, humidity, and film thickness, drying of the composition on the substrate can take from several minutes to one hour or more. For example, a film at a thickness of about 5 mils can be dried in a 70° C. oven in about between 3 to 5 minutes.

After drying the composition or during the drying of the composition, the flexible material to be laminated to the substrate is heated to soften the material. Typically, the material is heated to a temperature of between about 43° C. and about 82° C. The heated material is then contacted to the dried composition. Most typically, the material is contacted by draping the heated flexible material onto the substrate.

A vacuum is then applied to the flexible material over the substrate to draw the material into all recessed areas of the substrate. Typically, the vacuum is drawn for at least about 10 seconds. In the case of substrates which are not porous, holes are made in the substrate so that a vacuum can pull the flexible material onto the substrate. In the case of porous materials, such as some fiberboard, a vacuum can be achieved directly through the substrate without placing holes in the substrate.

Subsequent to application of a vacuum, the adhesive compositions disclosed here cure at room temperature in about 8–16 hours. Cure can be accelerated by heating the laminated substrate.

The following examples are provided to illustrate the best mode of carrying out the present invention and are not intended to limit the scope of the invention.

EXAMPLE 1

Into a stirred reaction vessel maintained under a nitrogen blanket were charged 102 pbw (parts by weight) isophorone diisocyanate, 79.94 pbw toluene diisocyanate, 179.13 pbw CARBOWAX MPGE 2000 pellets (polyethylene glycol monomethyl ether available from Union Carbide Chemicals and Plastics Company), and 851.00 pbw molten FORMREZ 44–56 (1,4-butanediol adipate, molecular weight about 2000, from Witco Corporation). Each of the above charges, except the CARBOWAX, was followed by a rinse of 61.98 pbw methyl isobutyl ketone. These reactants were heated to 50°–55° C. under agitation until all raw materials had melted to become a uniform mixture, then the temperature was raised to 90°–93° C. and held until the isocyanate equivalent weight reached 1562.06. Then 944.07 pbw acetone was charged and air cooling of the flask begun to lower the temperature below 50° C. A charge of 49.24 pbw acetone, 93.55 pbw JEFFAMINE T-403 {trimethylol propane poly(oxypropylene)triamine), molecular weight about 440, from Texaco}, and 100.69 pbw diketimine (reaction product of diethylene triamine and methyl isobutyl ketone) was fed to the flask over a period of 15 minutes, followed by a rinse of 82.09 acetone. The reaction mixture was held at 50°–55° C. until no isocyanate peak was observed by infrared spectrometry. 2633 pbw of the reaction product was reverse thinned into 2167.02 pbw deionized water and 38.30 pbw methylene sulfonic acid. Solvent was then stripped from the dispersion to attain 38 weight percent solids.

EXAMPLE 2

Three vacuum forming adhesive formulations in accordance with the present invention were prepared as indicated in Table 1. The ingredients were added serially in the order shown with mixing.

TABLE 1

| | Adhesive Formulations | | |
|---|---|---|---|
| Material | Example A Parts by Weight | Example B Parts by Weight | Example C Parts by Weight |
| Polyurethane (Example 1) | 192.23 | 197.83 | 203.2 |
| Ethylene/vinyl acetate[1] | 131.48 | 135.31 | 0 |
| Vinyl acetate[2] | 0 | 0 | 143.32 |
| Plasticizer[3] | 37.13 | 0 | 37.13 |
| Plasticizer[4] | 0 | 27.7 | 0 |
| Aziridine crosslinker[5] | 2.19 | 2.19 | 2.19 |
| Carbodiimide crosslinker[6] | 15.17 | 15.17 | 12.36 |
| Thickener[7] | 0.84 | 0.84 | 0.84 |

TABLE 1-continued

Adhesive Formulations

| Material | Example A Parts by Weight | Example B Parts by Weight | Example C Parts by Weight |
|---|---|---|---|
| Blue tint[8] | 0.96 | 0.96 | 0.96 |
| Deionized water | 20 | 20 | 20 |

[1] AIRFLEX 400 ethylene/vinyl acetate copolymer from Air Products and Chemical, Inc.
[2] ROVACE 3357 vinyl acetate polymer from Rohm & Haas.
[3] PLASTHALL BSA butyl benzene sulfonamide plasticizer available from The C. P. Hall Company.
[4] KFLEX UD-320W water soluble urethane diol plasticizer available from King Industries, Norwalk, Connecticut.
[5] XAMA-2, trimethylolpropane-tris-($\beta$-(N-aziridinyl)propionate), available from Virginia Chemicals.
[6] UCARLINK XL-29SE carbodiimide crosslinker from Union Carbide ?????
[7] RM 8 urethane associative thickener available from Rohm & Haas.
[8] AKROSPERSE E-98 blue tint from Arcochem Corp.

The formulations of Examples A–C were tested for performance in accordance with the test procedures set forth below, and the results are shown in Table 2.

SURLYN Bonding Test Procedure

Plaques of DYLARK resin (3 inches by 4 inches) were cleaned with ispropyl alcohol and coated with adhesive by spraying to a coating weight (dry) of 0.2 to 0.3 gram per 12 square inches. The adhesive coated plaques were baked for six minutes at 158° F., then cooled. A 5 mil thick SURLYN resin film was bonded onto each adhesive coated plaque surface with 5 inches of vacuum in a vacuum forming device (Formech 450 Vacuum Former). The film on each plaque was cut into two 1 inch wide strips the length of the panel. One strip, after aging for 1 hour at room temperature, was pulled at 180° with a force guage (Omega Model #DFG 51-50 force gauge) at a rate of 90 inches/minute. The second strip was pulled in a like manner after aging for 24 hours. Results were reported for each test in maximum pounds of force used.

Cotton Duck Bonding Test Procedure

DYLARK resin panels (2.75 inches by 1.0 inch) were cleaned with isopropyl alcohol. Thirteen pound cotton duck cloth specimens (4.0 inches by 1.0 inch) were cut. Test specimens were prepared by spraying adhesive on both the plastic panels and the duck cloth, and then the cloth was bonded to the panel with a 5 pound metal roller by rolling 10 passes. The sandwich was baked at 158° F. for 7 minutes and then aged for 72 hours at room temperature. The specimen was placed in a test frame and a weight is attached to the cloth so that force was applied at an angle of about 60 degrees. The frame with the specimen and weight in place was heated in an oven at 180° F. for 1 hour. The temperature was raised by 20 degrees and held for an additional hour. Incremental temperature increases were continued until the temperature reaches 240° F. At each interval, the point of separation of the cotton duck cloth from the substrate was marked. Failure was noted when the cloth pulled off the plastic or the plastic distorted enough from the heat and forced to release from the frame. Results were reported in terms of percentage of total length moved at each temperature interval.

ABS-trilaminate Test Procedure

Test plaques (4 inches by 6 inches) of acrylonitrile-butadiene-styrene resin (ABS) were coated with adhesive by draw down with a 6 mil draw bar. Plaques were dehydration baked for 5 minutes at 158° F. and cooled. Trilaminate strips (imitation leather, comprised of a backing layer, textured layer, and cover sheet) were preheated at 180° F. for 10 to 20 minutes and the ABS plaques were placed in the oven for 4 minutes. The vinyl strips were bonded to the ABS plaque by covering each plaque with trilaminate, placing the sandwich in a Carver press (Carver Press Model 2697), and bonding with 14.6 pounds per square search for 11 seconds. Samples were cooled for 1 hour and then tested for 180° peel strength using the digital force gauge (Omega DFG 51-50 Digital Force Gauge). After 24 hours the peel strength test was repeated. Results were reported on 1 hour and 24 hour maximum peel resistance in pounds/linear inch of sample width. After 72 hours the plaque was placed in a test frame for hanging weight peel resistance at 190° F. as a function of time. A 150 gram weight was clipped onto the trilaminate sample and permitted to hang at an angle slightly offset from the plane of the plaque. The location of separation between the substrate and the tralaminate layer was marked and the sample placed into an oven at 190° F. The location of the separation was marked after one hour and after five hours. For the 190° F. hanging weight test, either the time to failure (if less than 5 hours) or the distances moved in one hour and five hours were reported.

TABLE 2

ADHESIVE TEST RESULTS

| EXAMPLE/RUN: | A/1 | A/2 | B/1 | B/2 | C/1 | C/2 |
|---|---|---|---|---|---|---|
| INITIAL RESULTS | | | | | | |
| % Solids at application | 51.3 | | 49 | | 49.9 | |
| Brookfield, RVF, #3 @ 20 RPM | 750 | | 650 | | 1,200 | |
| pH | 6.90 | | 6.80 | | 7.20 | |
| SURLYN substrate bonding | | | | | | |
| Peel Values (lbs/inch) | | | | | | |
| 1 hr. | 2.60 | 2.88 | 0.75 | 0.72 | 1.72 | 1.76 |
| 24 hr | 2.42 | 2.42 | 0.24 | 0.24 | 2.56 | 1.60 |
| Cotton duck - DYLARK substrate bonding | | | | | | |
| % movement @ 180 F. | 29% | | 71% | | 71% | 55% | Failed (10 min.) | Failed (10 min.) |
| % movement @ 200 F. | 44% | | Failed (20 min) | Failed (52 min) | 71% | |
| % movement @ 220 F. | 51% | | | 85% | | |
| % movement @ 240 F. | 51%* | | Failed (30 min.) | | | |
| ABS substrate - trilaminate bonding | | | | | | |
| Peel Values (lbs/inch) | | | | | | |
| 1 hr. | 25.2 | | 15.7 | | 11.54 | |
| 24 hr | 24.9 | | 22.4 | | 17.62 | |
| 1 Hr @ 190 F. movement | 3 mm | | 15 mm | | 6 mm | |
| 5 Hr @ 190 F. movement | 44 mm | | 42 mm | | 12 mm | |
| 24 HOUR @ 110 F. TEST RESULTS | | | | | | |
| Brookfield, RVF, #3 @ | 700 | | 500 | | 800 | |

TABLE 2-continued

ADHESIVE TEST RESULTS

| EXAMPLE/RUN: | A/1 | A/2 | B/1 | B/2 | C/1 | C/2 |
|---|---|---|---|---|---|---|
| 20 RPM pH | 6.70 | | 6.60 | | 6.90 | |
| SURLYN susbstrate bonding (pounds/linear inch) | | | | | | |
| Peel Values | | | | | | |
| 1 hr. | 3.12 | 3.34 | 0.42 | 0.42 | 0.58 | 0.60 |
| 24 hr. | 3.34 | 3.38 | 0.24 | 0.28 | 0.60 | 0.92 |
| Cotton duck - DYLARK substrate bonding | | | | | | |
| % movement @ 180 F. | 0% | 0% | 2% | 24% | Failed (9 min.) | Failed (9 min.) |
| % movement @ 200 F. | 2% | 2% | 4% | 33% | | |
| % movement @ 220 F. | 2% | 2% | 7% | 38% | | |
| % movement @ 240 F. | 4%* | 4%* | 9%* | 40%* | | |
| ABS substrate - trilaminate-bonding | | | | | | |
| Peel Values | | | | | | |
| 1 hr. | 22.16 | | 20.60 | | 7.7 | |
| 24 hr | 22.92 | | 28.06 | | 10.4 | |
| 1 Hr @ 190 F. movement | 2 mm | | 40 mm | | 26 Min | |
| 5 Hr @ 190 F. movement | 10 mm | | 1 hr 45 min | | | |

*Substrate integrity failed.

As can be seen from Examples A–C, adhesive formulations of the present invention have excellent adhesive properties and provide strong adhesion with good heat resistance. Formulations in accordance with the present invention are highly stable and are usable as one package adhesive formulations.

The following Example D is an adhesive formulation within the scope of the present invention that does not include aziridine. This composition exhibited a desirable combination of stability and adhesion strength.

| Material | Parts by Weight |
|---|---|
| Polyurethane (Example 1) | 147.76 |
| Ethylene/vinyl acetate[1] | 124.36 |
| Plasticizer[2] | 37.20 |
| Thickener[3] | 0.42 |
| Aziridine crosslinker | 0 |
| Carbodiimide crosslinker[4] | 15.20 |
| Tint[5] | 0.52 |
| Deionized water | 20 |

[1] AIRFLEX 300 ethylene/vinyl acetate copolymer from Air Products and Chemicals, Inc.
[2] PLASTHALL BSA butyl benzene sulfonamide plasticizer available from The C. P. Hall Company.
[3] RM 8 urethane associative thickener available from Rohm & Haas.
[4] UCARLINK XL-29SE carbodiimide crosslinker from Union Carbide.
[5] AKROSPERSE E-98 blue tint from Arcochem Corp.

It should be understood that the invention has been set forth with reference to specific embodiments for the sake of disclosing the best mode of carrying out the invention, but that other variations and modifications as would be apparent to those of skill in the art are intended to be within the scope of the invention as defined by the claims.

We claim:

1. A water-based adhesive composition, comprising:

(a) an ionic water-dispersed polyurethane having a polydispersity index of at least 20; and (b) a carbodiimide.

2. The composition of claim 1 further including an aziridine curing agent.

3. The composition of claim 1 further including a vinyl acetate polymer or copolymer.

4. The composition of claim 1 wherein the polyurethane (a) includes cationic groups derived from amine groups.

5. The composition of claim 4 wherein the polyurethane (a) is the reaction product of a urethane prepolymer containing isocyanate groups reacted in solvent with isocyanate-reactive ketimine and polyamine, followed by hydrolysis of the ketimine and neutralization to form cationic amine groups.

6. The composition of claim 5 wherein the ketimine is a diketimine.

7. The composition of claim 5 wherein the polyamine is a triamine.

8. The composition of claim 1 wherein said composition is stable for at least 30 days at 23° C.

9. The composition of claim 1 further including a plasticizing agent.

10. The composition of claim 8, comprising:

24–64 weight percent of an ionic water dispersed polyurethane (a) based on weight of resin solids;

0–48 weight percent of vinyl acetate based on weight of resin solids;

0–10 weight percent of aziridine based on weight of resin solids;

0.5–10 weight percent of carbodiimide; and

0–33 weight percent of plasticizer based on weight of resin solids.

11. The composition of claim 2 wherein said aziridine is trimethylolpropane-tris-(β-(N-aziridinyl)propionate).

12. The composition of claim 1 wherein the polydispersity index of the polyurethane is at least 25.

13. A waterborne polyurethane which is the reaction product of a urethane prepolymer containing isocyanate groups reacted in solvent with isocyanate-reactive ketimine and polyamine, followed by hydrolysis of the ketimine and neutralization to form cationic amine groups.

14. The composition of claim 13 wherein the ketimine is a diketimine.

15. The composition of claim 13 wherein the polyamine is a triamine.

16. The composition of claim 13 wherein the polydispersity index of the polyurethane is at least 20.

17. The composition of claim 13 wherein the polydispersity index of the polyurethane is at least 25.

* * * * *